(12) United States Patent
Lang et al.

(10) Patent No.: US 6,702,320 B1
(45) Date of Patent: Mar. 9, 2004

(54) MOTOR VEHICLE AIR BAG SYSTEM WITH A CABLE-TYPE GAS GENERATOR

(75) Inventors: Rüdiger Lang, Ampfing (DE); Günter Herrmann, Feldkirchen (DE)

(73) Assignee: Autoliv Development AB (SE)

( * ) Notice: Subject to any disclaimer, the term of this patent is extended or adjusted under 35 U.S.C. 154(b) by 22 days.

(21) Appl. No.: 10/069,497

(22) PCT Filed: Aug. 15, 2000

(86) PCT No.: PCT/EP00/07939

§ 371 (c)(1),
(2), (4) Date: Feb. 15, 2002

(87) PCT Pub. No.: WO01/12475

PCT Pub. Date: Feb. 22, 2001

(30) Foreign Application Priority Data

Aug. 16, 1999 (DE) .......................... 199 38 726

(51) Int. Cl.⁷ .......................... B60R 21/24; B60R 21/26
(52) U.S. Cl. .......................... 280/729; 280/736; 280/742
(58) Field of Search .................. 280/729, 730.2, 280/731, 732, 736, 740, 741, 742; 55/341.5

(56) References Cited

U.S. PATENT DOCUMENTS 3,840,246 A * 10/1974 McCullough et al. ....... 280/738
4,136,894 A * 1/1979 Ono et al. ................... 280/729
5,542,695 A * 8/1996 Hanson ....................... 280/729
5,899,494 A * 5/1999 Lane, Jr. ..................... 280/739
5,984,348 A * 11/1999 Specht et al. ............. 280/730.2
6,062,143 A * 5/2000 Grace et al. ................. 102/530
6,260,877 B1 * 7/2001 Rasmussen, Sr. ........... 280/729
6,378,895 B1 * 4/2002 Brucker et al. .......... 280/730.2
2001/0038199 A1 * 11/2001 Fischer .................... 280/730.2

FOREIGN PATENT DOCUMENTS

| DE | 198 16 061 | 10/1988 |
| DE | 393 2576 | 4/1992 |
| DE | 41 16 882 | 12/1992 |
| DE | 41 34 995 C1 | 3/1993 |
| DE | 43 05 291 | 9/1993 |
| DE | 19620537 | 12/1996 |

* cited by examiner

Primary Examiner—Paul N. Dickson
Assistant Examiner—Laura B. Rosenberg
(74) Attorney, Agent, or Firm—R W Becker & Associates; R W Becker

(57) ABSTRACT

An airbag system for a motor vehicle, characterized in that a separate cable-type gas generator (5) is associated with the individual chambers (3) of said air bag system extending in the form of a harness from a central initiator (23) to the respective inflatable chamber (3) of said airbag system.

16 Claims, 2 Drawing Sheets

MOTOR VEHICLE AIR BAG SYSTEM WITH A CABLE-TYPE GAS GENERATOR

BACKGROUND OF THE INVENTION

The invention relates to an airbag arrangement for a motor vehicle and has a plurality of inflatable chambers that are connected to a gas generator.

Various embodiments of such airbag arrangements in a motor vehicle are known as so-called driver airbags or passenger airbags (in conformity with DE 196 20 537 A1), or as an airbag curtain (curtain) disposed in the side portion of a motor vehicle (in conformity with DE 198 16 061). With the known airbag arrangements, a gas generator that operates pyrotechnically is provided for producing the gas necessary for the inflation of the individual inflatable chambers of the airbag arrangement; the gas flows from the gas generator into the individual chambers, or might be conducted through distribution arrangements. This has the drawback that after activation of the gas generator, the gas produced thereby must first be distributed into the inflatable chambers of the airbag arrangement, so that the individual chambers of the airbag arrangement are inflated with a time delay, albeit a slight delay. Consequently, the inflation process also takes place correspondingly slowly, which is disadvantageous. A further drawback is that due to the relatively large, centrally produced quantity of gas for the inflation of the airbag curtain, the sonic pressure generated during inflation of the airbag curtain is very high.

It is therefore an object of the present invention to provide for an airbag arrangement having the aforementioned features a uniform and careful as well as rapid inflation of the chambers of the airbag arrangement.

SUMMARY OF THE INVENTION

The realization of this object, including advantageous embodiments and further developments of the invention, are provided from the content of the patent claims that follow this specification.

The basic concept of the invention is that a separate cord-type gas generator is associated as the gas generator with the individual chambers of the airbag arrangement, and are guided from a central initiator in the form of a strand into the respective inflatable chambers of the airbag arrangement. The construction of such a cord-type gas generator is known, for example, from DE 39 32 576 C1.

The present invention has the advantage that the gas, via the cord-type gas generators that extend into the inflatable chambers of the airbag arrangement, is produced directly in the regions of the airbag arrangement in which the gas is needed. With such a decentralized gas generation, not only is a uniform and simultaneous unfolding of all of the chambers of the airbag arrangement achieved, but in addition the sonic pressure that occurs is reduced. In so doing, due to the careful inflation of the airbag arrangement, the fabric or woven airbag material that is used is stressed to a lesser degree. Finally, it is possible in an advantageous manner to fold or roll up the arrangement together with the cord-type gas generators that are already disposed therein for installation in the motor vehicle.

To the extent that the invention is directed to an airbag arrangement in the form of a passenger airbag that comprises a plurality of chambers, it is provided that the initiator be disposed in the dashboard of the motor vehicle, and the cord-type gas generators, which are associated with the individual inflatable chambers, in their region that leads away from the initiator be held together by connecting means to form a common strand, and at the connection of each individual chamber the pertaining cord-type gas generator is branched off from the strand and is guided into the chamber. Connected herewith is the advantageous effect that depending upon the length of the respective cord-type gas generator, and also upon the positioning of the discharge openings in the casing that forms a part of the cord-type gas generator, the pressure in the respective inflatable chambers of the passenger airbag can be influenced.

In another embodiment, the present invention is directed to an airbag arrangement in the form of an airbag curtain that unfolds over at least a portion of the side of the vehicle out of a module that is disposed in the roof beam, and that comprises a plurality of inflatable chambers that are connected to a gas supply channel that is connected with a gas generator; such an airbag curtain is known from DE 198 16 061 A1.

In a first embodiment in this connection there is provided that the cord-type gas generators, which are associated with the individual inflatable chambers of the airbag curtain, in their region that leads away from a centrally disposed initiator and extends in the gas supply channel, are joined by connecting means to form a common strand, and at the connection of each individual chamber to the gas supply channel, the pertaining cord-type gas generator is branched off from the strand and is guided into the chamber.

In a modified embodiment it is also possible with an airbag curtain to provide in the gas supply channel a cord-type gas generator that extends centrally along the gas supply channel and from which further cord-type gas generator sections, which are connected via branching means, extend into the individual inflatable chambers of the airbag curtain. For the configuration of the required branching means, respective T-shaped sleeves can be disposed at the branching means, with the two aligned legs of the sleeves being placed over the central cord-type gas generator, and with the respective cord-type gas generator sections being introduced into the T-connectors of the sleeves and being fixed in position therein.

In individual cases, a cord-type gas generator can be disposed in each individual inflatable chamber; it can, however, also be sufficient to respectively introduce a cord-type gas generator into only a portion of the respective inflatable chamber.

In order when the airbag arrangement is embodied as an airbag curtain to ensure a longer useful life of the inflated airbag curtain, an additional cold gas generator is provided that is comprised of a pressure tank that is provided with an opening device and has stored therein a supply of gas; this supply of gas is released with time delay relative to the burning off of the cord-type gas generator. To the extent that the gas generated by the cord-type gas generator loses volume as a result of cooling off, the cold gas generator, after being actuated, recharges an appropriate quantity of gas, so that the useful life of the inflated airbag curtain is extended. The combination of a pyrotechnical gas generation with a cold gas generator is disclosed, for example, in DE 197 53 074 C1; however, in that case the prestored cold gas is also simultaneously released with the pyrotechnical gas generation in order to reduce the temperature of the hot gas that is pyrotechnically produced.

Pursuant to one embodiment of the present invention, the opening device of the pressure tank is activated by a time-control device. Alternatively, the activation of the opening device can be effected directly by the unfolding airbag curtain by having the opening device of the pressure tank be connected to the unfolding airbag curtain. This connection can, pursuant to one specific embodiment, also be realized by having the lower free edge of the unfolding airbag curtain be connected with the opening device by a release cord.

BRIEF DESCRIPTION OF THE DRAWINGS

The drawings provide specific embodiments of the invention, which is described subsequently. Shown are.

DESCRIPTION PREFERRED EMBODIMENT

Figure 1:
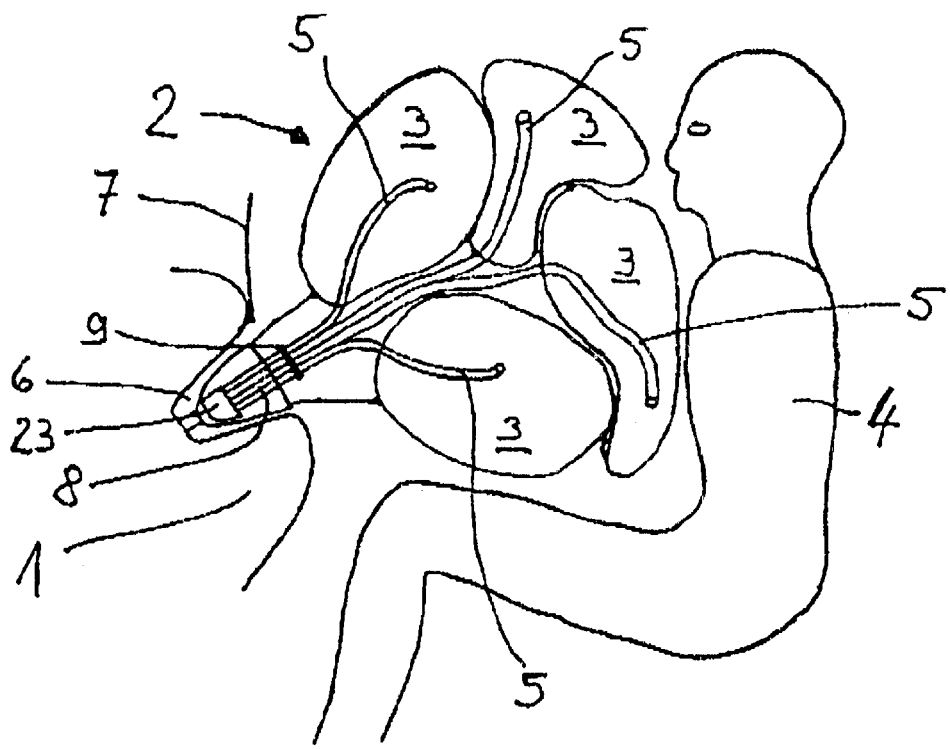
FIG. 1 a schematic illustration of an airbag arrangement embodied as a passenger airbag, FIG. 2 a view of the side portion of a motor vehicle, FIG. 3 a side view of an airbag curtain unfolded in front of the side portion of FIG. 2, FIG. 4 another embodiment of the airbag curtain of FIG. 3, FIG. 5 an enlarged detailed illustration of the branching means provided in the embodiment of FIG. 4.

In the embodiment illustrated in FIG. 1, and showing an airbag arrangement in the form of a passenger air bag, the reference numeral 1 designates the dashboard of a motor vehicle, in the mounting space 6 of which, when the airbag arrangement is not actuated, a passenger airbag 2 is folded in; the mounting space 6 is closed off by a protective cover 7. In the illustration of FIG. 1, the passenger airbag 2 is deployed out of the mounting space 6 and is inflated, so that the protective cover 7 is pivoted open and the passenger airbag 2, in a protective manner, has unfolded in front of the vehicle occupant 4. The passenger airbag 2 comprises individual inflatable chambers 3, with a separate cord-type gas generator 5 being associated with each inflatable chamber 3. The cord-type gas generators 5 that are associated with the individual chambers 3 are guided in common to a central initiator 23 that is disposed in the mounting space 6 of the dashboard 1, and in the region of the mounting space 6 are initially joined by a clamp 9 to form a strand 8. Depending upon the connection of the individual chambers 3, the individual cord-type gas generators 5 for each of the inflatable chambers 3 are then respectively branched off from this strand 8.

An embodiment of the invention is illustrated in FIGS. 2 to 5, according to which the airbag arrangement is embodied as a so-called side airbag or curtain having a curtain that unfolds in front of the side portion of the motor vehicle.

Figure 2:
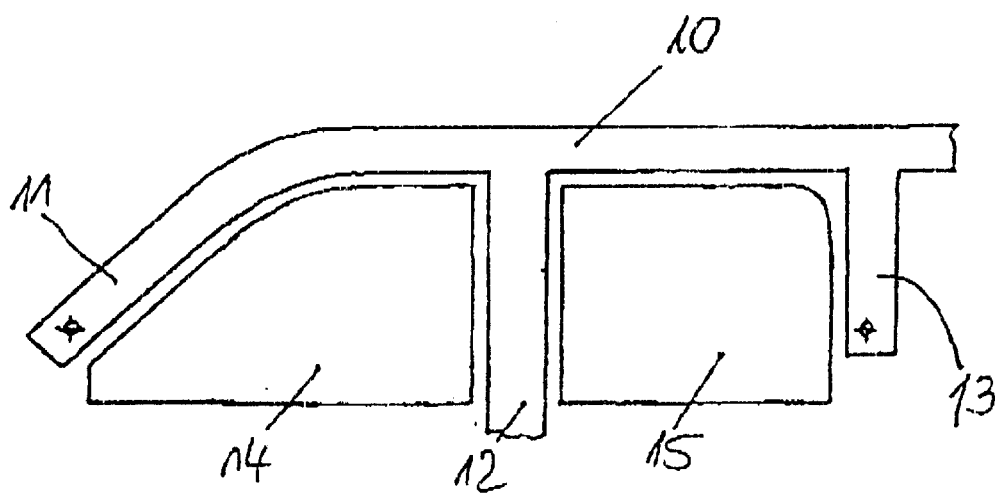

The side member of a motor vehicle illustrated in FIG. 2 comprises the columns that are successively disposed in the direction of travel of the motor vehicle, and support a roof beam 10, with 11 designating the so-called A-column, 12 designating the so-called B-column, and 13 designating a C-column. The front side window is designated by 14 and the rear side window by 15.

Figure 3:
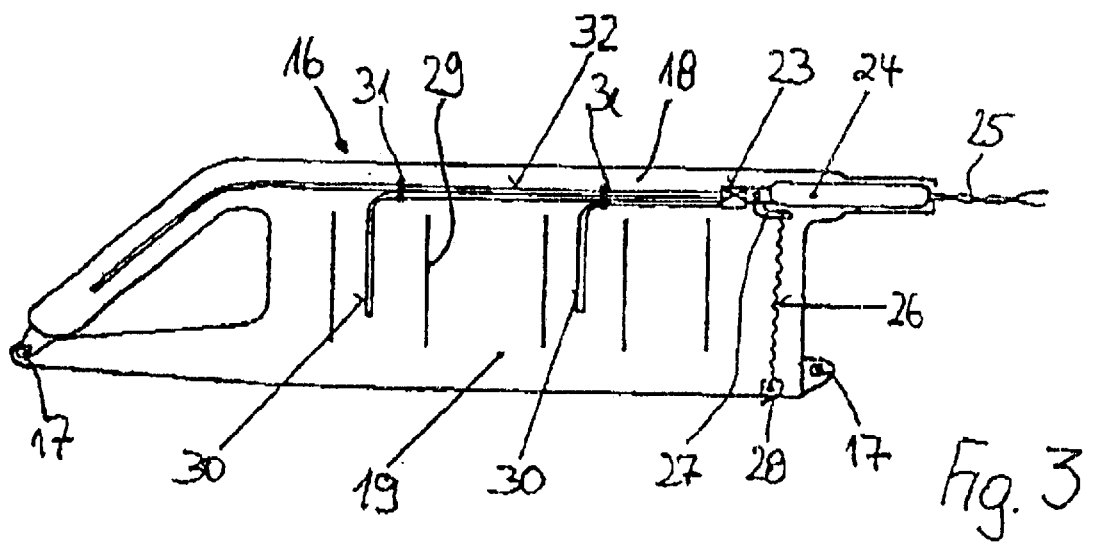
Figure 4:
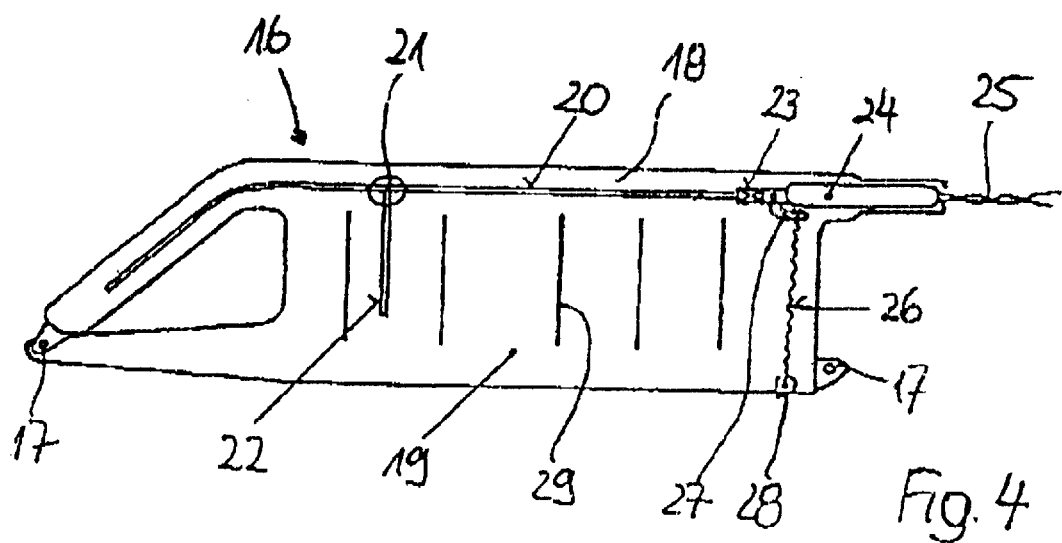

The airbag curtain 16, which is illustrated in detail in FIGS. 3 and 4, is connected at the points of securement 17 on the one hand with the A-column 11 and on the other hand with the C-column 13. Formed along the roof beam 10, in the upper region of the airbag curtain 16, is a gas supply channel 18 from which open out vertical chambers 19 which are separated by tucks or seams that are schematically indicated by the reference numeral 29.

In the embodiment illustrated in FIG. 3, similar to the airbag arrangement described in conjunction with FIG. 1, individual cord-type gas generators 30, which extend into the inflatable chambers 19, are disposed between the initiator 23 which is disposed in the roof beam 10, and the individual inflatable chambers 19 of the airbag curtain 16; in the region of the gas supply channel 18, the cord-type gas generators are joined by appropriately disposed clamps 31 to form a strand 32. At each connection of an inflatable chamber 19 to a gas supply channel 18, the pertaining cord-type gas generator 30 branches off from the strand 32 and extends into the associated chamber 19.

In the embodiment illustrated in FIG. 4, for the production of gas a central cord-type gas generator 20 is first disposed in the airbag curtain 16. The cord-type gas generator 20 is disposed in the gas supply channel 18, whereby further cord-type gas generator sections 22, which are connected via branches 21, are guided into the individual chambers 19. At that end thereof that is disposed in the vicinity of the C-column 13, the cord-type gas generator 20 is connected to an initiator 23, which is ignited by an ignition pulse that is transmitted via the lines 25.

Figure 5:
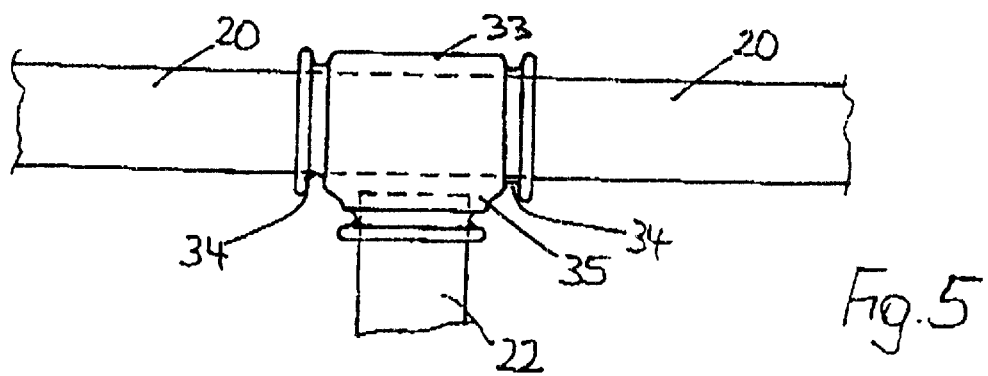

FIG. 5 illustrates an embodiment of how the branches 21 can be configured. For this purpose, a T-shaped sleeve 33 is placed over the central cord-type gas generator 20 via the aligned legs 34 of the sleeve, whereby the cord-type gas generator section 22, which is disposed in the associated chamber 19 of the airbag curtain 16, is introduced into the T-connector 35 and is fixed in position in the sleeve 33. The fixing in position can be effected in the manner of a press fit connection.

In the embodiments of FIGS. 3 and 4, in addition to the respective cord-type gas generator, a cold gas generator having a pressure tank 24, in which pressurized gas is stored, is connected to the gas supply channel 18. The pressure tank 24 is provided with an opening device 27 that is connected via a release cord 26 with a lower free edge 28 of the airbag curtain 16.

When an accident occurs, an ignition of the cord-type gas generator 30 or 20 along with the sections 22 connected thereto is first effected via the initiator 23, whereby due to the construction of the cord-type gas generator 30 or 20,22, a nearly simultaneous burning of the cord-type gas generator 30 or 20,22 takes place. This causes a very rapid and uniform unfolding of the airbag curtain 16. At the conclusion of this unfolding process, the lower free edge 28 of the airbag curtain 16 tensions the release cord 26, thereby activating the opening device 27 of the pressure tank 24, so that the gas stored in the pressure tank 24 can flow out.

The features of this subject matter of this document disclosed in the preceding specification, the patent claims, the abstract and the drawings can be important individually as well as in any combination with one another for realizing the various embodiments of the invention.

The specification incorporates by reference the disclosure of German priority document 199 38 726.5 filed Aug. 16 1999 and International priority document PCT/EP00/07939 filed Aug. 15 2000.

What is claimed is:

1. An airbag arrangement for a motor vehicle, comprising:
    a plurality of inflatable chambers; and
    for each of said inflatable chambers, a separate cord-type gas generator, wherein said gas generators extend from a central initiator in the form of a strand and then are individually guided into a respective one of said inflatable chambers.

2. An airbag arrangement according to claim 1, wherein said airbag arrangement is in the form of a passenger airbag having a plurality of individual inflatable chambers, wherein said initiator is disposed in a dashboard of said motor vehicle, wherein said separate cord-type gas generators are held together by connecting means to form a common strand in a region leading from said initiator toward said inflatable chambers, and wherein individual ones of said cord-type gas generators branch off from said strand and are guided into a respective one of said inflatable chambers.

3. An airbag arrangement according to claim 1, wherein said airbag arrangement is in the form of an airbag curtain that unfolds over at least a portion of a side of said vehicle out of a module disposed in a roof beam of said vehicle, wherein said airbag curtain comprises said plurality of individual inflatable chambers, which are connected to a gas supply channel in which said gas generator strand is disposed, wherein said separate cord-type gas generators are joined together by connecting means to form a common strand in a region leading from said initiator and extending in said gas supply channel, and wherein where said individual inflatable chambers are connected to said gas supply channel, individual ones of said cord-type gas generators branch off from said common strand and are guided into a respective one of said inflatable chambers.

4. An airbag arrangement according to claim 3, wherein a cold gas generator is provided that is comprised of a pressure tank that is provided with an opening device and has a supply of gas stored therein, wherein said pressure tank is adapted to release gas with a time delay relative to a burning-off of said cord-type gas generator.

5. An airbag arrangement according to claim 4, wherein a time-control device is provided for activating said opening device of said pressure tank.

6. An airbag arrangement according to claim 4, wherein said opening device of said pressure tank is connected to said airbag curtain in such a way that when said airbag curtain is inflated it activates said opening device.

7. An airbag arrangement according to claim 6, wherein a lower free edge of said airbag curtain, when viewed in an unfolding state of said airbag curtain, is connected with said opening device via a release cord.

8. An airbag arrangement according to claim 1, wherein said airbag arrangement is in the form of an airbag curtain that unfolds over at least a portion of a side of said vehicle out of a module disposed in a roof beam of said vehicle, wherein said airbag curtain comprises said plurality of individual inflatable chambers, which are connected to a gas supply channel in which said gas generator strand is disposed, wherein said gas generator strand is a cord-type gas generator that extends centrally in said gas supply channel, and wherein cord-type gas generator sections are connected to said cord-type gas generator via branching means and extend into respective ones of said inflatable chambers.

9. An airbag arrangement according to claim 8, wherein respective T-shaped sleeves are disposed at said branching means, wherein said sleeves have two aligned legs that are placed over said centrally extending cord-type gas generator, and wherein each of said sleeves has a T-connector into which is introduced a respective one of said cord-type gas generator sections, which are fixed in position in said sleeve.

10. An airbag arrangement according to claim 8, wherein a cold gas generator is provided that is comprised of a pressure tank that is provided with an opening device and has a supply of gas stored therein, wherein said pressure tank is adapted to release gas with a time delay relative to a burning-off of said cord-type gas generator.

11. An airbag arrangement according to claim 10, wherein a time-control device is provided for activating said opening device of said pressure tank.

12. An airbag arrangement according to claim 10, wherein said opening device of said pressure tank is connected to said airbag curtain in such a way that when said airbag curtain is inflated it activates said opening device.

13. An airbag arrangement according to claim 12, wherein a lower free edge of said airbag curtain, when viewed in an unfolding state of said airbag curtain, is connected with said opening device via a release cord.

14. An airbag arrangement for a motor vehicle, comprising:

a plurality of inflatable chambers; and for each of said inflatable chambers, a separate cord-type gas generator, wherein said gas generators extend from a central initiator in the form of a strand and then are individually guided into a respective one of said inflatable chambers, wherein said airbag arrangement is in the form of a passenger airbag having said plurality of individual inflatable chambers, wherein said initiator is disposed in a dashboard of said motor vehicle, wherein said separate cord-type gas generators are held together by connecting means to form a common strand in a region leading from said initiator toward said inflatable chambers, and wherein individual ones of said cord-type gas generators branch off from said strand and are guided into a respective one of said inflatable chambers.

15. An airbag arrangement for a motor vehicle, comprising:

a plurality of inflatable chambers; and for each of said inflatable chambers, a separate cord-type gas generator, wherein said gas generators extend from a central initiator in the form of a strand and then are individually guided into a respective one of said inflatable chambers, wherein said airbag arrangement is in the form of an airbag curtain that unfolds over at least a portion of a side of said vehicle out of a module disposed in a roof beam of said vehicle, wherein said airbag curtain comprises said plurality of individual inflatable chambers, which are connected to a gas supply channel in which said gas generator strand is disposed, wherein said separate cord-type gas generators are joined together by connecting means to form a common strand in a region leading from said initiator and extending.in said gas supply channel, and wherein where said individual inflatable chambers are connected to said gas supply channel, individual ones of said cord-type gas generators branch off from said common strand and are guided into a respective one of said inflatable chambers.

16. An airbag arrangement for a motor vehicle, comprising:

a plurality of inflatable chambers; and for each of said inflatable chambers, a separate cord-type gas generator, wherein said gas generators extend from a central initiator in the form of a strand and then are individually guided into a respective one of said inflatable chambers, wherein said airbag arrangement is in the form of an airbag curtain that unfolds over at least a portion of a side of said vehicle out of a module disposed in a roof beam of said vehicle, wherein said airbag curtain comprises said plurality of individual inflatable chambers, which are connected to a gas supply channel in which said gas generator strand is disposed, wherein said gas generator strand is a cord-type gas generator that extends centrally in said gas supply channel, and wherein cord-type gas generator sections are connected to said cord-type gas generator via branching means and extend into respective ones of said inflatable chambers.

* * * * *

UNITED STATES PATENT AND TRADEMARK OFFICE
CERTIFICATE OF CORRECTION

PATENT NO. : 6,702,320 B1
DATED : March 9, 2004
INVENTOR(S) : Herrmann et al.

It is certified that error appears in the above-identified patent and that said Letters Patent is hereby corrected as shown below:

<u>Title page,</u>
Item [54], Title, should read as follows:

-- MOTOR VEHICLE AIRBAG ARRANGEMENT WITH A CORD-TYPE GAS GENERATOR --

Signed and Sealed this

Eighteenth Day of May, 2004

JON W. DUDAS
*Acting Director of the United States Patent and Trademark Office*